April 29, 1958   L. G. SIMJIAN   2,832,146
INVENTORY SYSTEM
Filed July 15, 1955   2 Sheets-Sheet 1
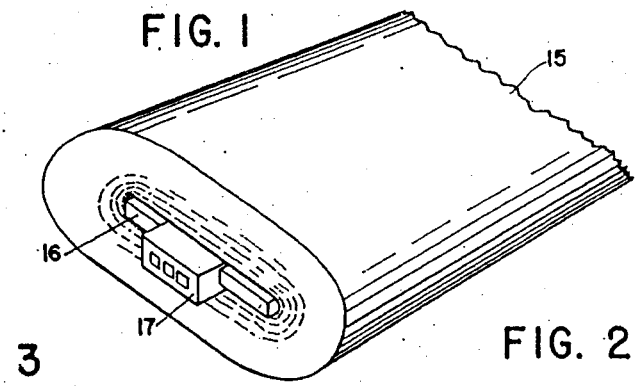
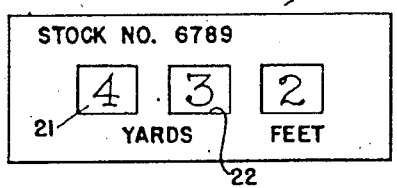
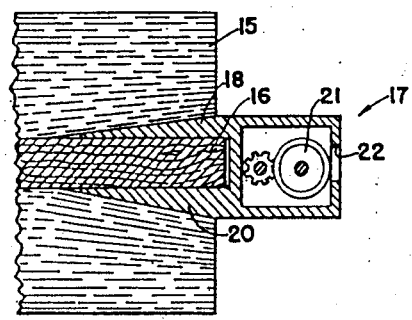
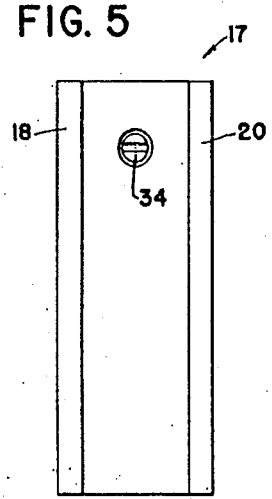
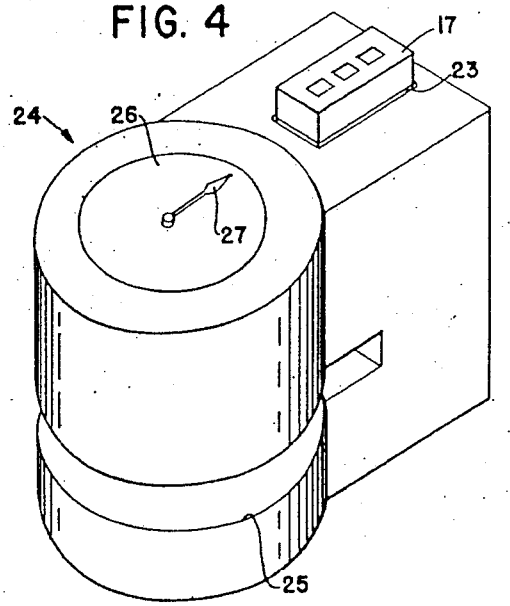
LUTHER G. SIMJIAN
INVENTOR
BY Ralph E. Bitner
ATTORNEY April 29, 1958  L. G. SIMJIAN  2,832,146
INVENTORY SYSTEM
Filed July 15, 1955  2 Sheets-Sheet 2
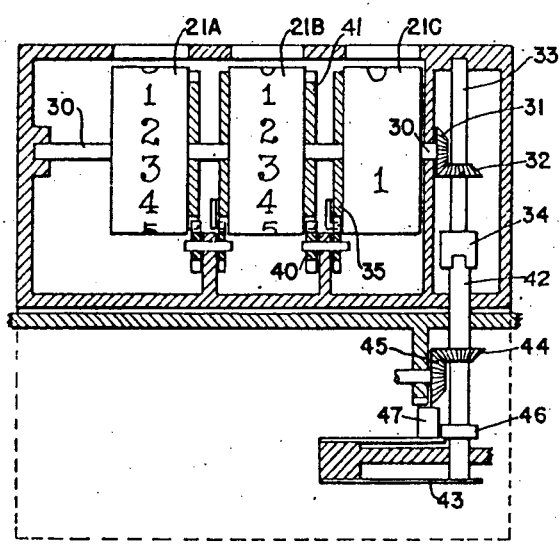
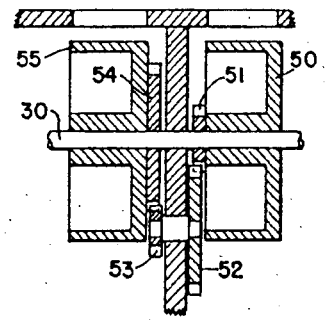
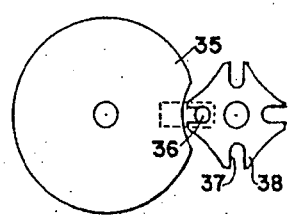
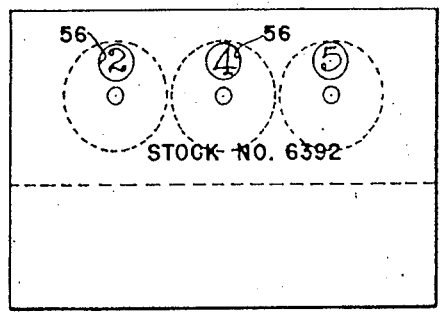
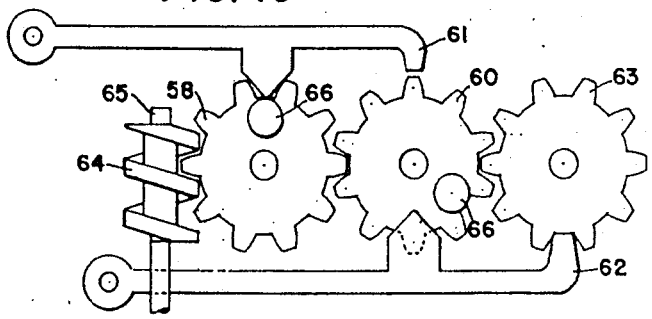
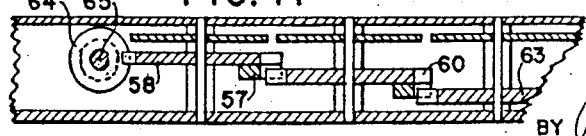
LUTHER G. SIMJIAN
INVENTOR
BY Ralph W. A. Bitner
ATTORNEY

United States Patent Office 2,832,146
Patented Apr. 29, 1958

2,832,146

INVENTORY SYSTEM

Luther G. Simjian, Greenwich, Conn., assignor to The Reflectone Corporation, Stamford, Conn., a corporation of Connecticut Application July 15, 1955, Serial No. 522,205

4 Claims. (Cl. 33—129)

This invention relates to an inventory system for use in connection with dispensable material and has particular reference to a means for indicating the length of material stored in a bolt or container.

It is customary to store lengths of cloth and other flexible material in bolts which generally are wound around a flat wooden or cardboard core. In retail stores where such material is sold in small lengths it is very difficult to keep an accurate record of the material remaining in any bolt and therefore when a store inventory is taken, or at any other time when it is desired to determine the length of cloth remaining on a bolt, all the material must be unwound and run through a measuring machine in order to determine its accurate length. Such an operation is time consuming, and in addition the cloth must be rewound on the core and placed back on the shelf. The present invention eliminates all this work and provides a simple and easy method of determining the exact length of cloth on each bolt without moving it from the shelf.

One of the objects of this invention is to provide an improved inventory system which avoids one or more of the disadvantages and limitations of prior art arrangements.

Another object of the invention is to indicate the length of dispensable material in each of a plurality of storage rolls.

Another object of the invention is to permit easy, quick, and accurate inventory of all material stored in rolls.

Another object of the invention is to prohibit unauthorized use of the cloth measuring devices generally provided in sales rooms and department stores.

Another object of the invention is to reduce the cost of inventory listing.

The invention comprises a first numerical indicating means which is generally secured to or associated with the bolt of cloth and indicates the length of the material remaining in the bolt. A second indicating device is adapted to engage the material and record a value equal to the length of the material passing through a portion of the device. Mechanical coupling means are provided to couple the first and second indicating means so that both are responsive to the length of material measured by the second indicating means.

For a better understanding of the present invention, together with other and further objects thereof, reference is made to the following description taken in connection with the accompanying drawings.

Fig. 1 is an isometric view of a bolt of cloth showing an inventory device attached thereto.

Fig. 2 is an end view of the inventory device.

Fig. 3 is a cross sectional view of the bolt of cloth and the inventory device showing how the two are joined when not in use.

Fig. 4 is an isometric view of a cloth measuring machine showing the inventory device coupled to it.

Fig. 5 is a bottom view of the inventory device.

Fig. 6 is a cross sectional view of the inventory device with some parts in elevation, shown in its coupled relationship to a portion of the cloth measuring device.

Fig. 7 is a cross sectional view of an alternate form of inventory device.

Fig. 8 is a detailed view of one form of carry arrangement which may be employed in the inventory device.

Fig. 9 is a plan view of another alternate form of inventory device.

Fig. 10 is a detailed view, partly schematic, of the gears employed in the device shown in Fig. 9.

Fig. 11 is a side view, with some parts in section, of the gear arrangement shown in Fig. 10.

Referring now to Figs. 1, 2, 3, and 4, a bolt of cloth 15 is shown wound upon a wooden core 16 which supports a digital counter 17, comprising the inventory device. This counter, or numerical indicating means, may be attached to the bolt core by the use of two elongated wedges 18 and 20 which enclose the core and are held in place by the pressure of the material remaining on the bolt. Each bolt contains one indicating means and the stock number of the material is indicated on its face.

Digital indicating wheels 21 are mounted inside the inventory device and are positioned to show the number of yards and feet remaining on the bolt, such numbers being observed through windows 22 formed in the end of the housing.

When a new bolt is placed upon the store shelf the inventory device is manually set to indicate the number of yards on the bolt. This may be done by coupling a proprietary key device, such as a screwdriver, to the input shaft and spinning the wheels until the proper number is indicated. When the first sale is made the inventory device is removed from the core and placed in a recess 23 in a cloth measuring device 24 of the type which are now generally used by salesmen to measure cloth for a customer. This measuring device is generally mounted on a table and includes a slot 25 having means associated therewith for engaging the material when it is pulled through. The length of the material sold to the customer is indicated on a dial 26 by a pointer 27. The pointer is manually set to zero before each measuring operation so that it indicates the length of cloth sold to each customer.

When the inventory device is placed into recess 23, the two mechanisms are coupled together and when the cloth or other dispensable material is passed through slot 25 both indicating means are operated, the measuring device moving from its zero setting to a setting which shows the length of material which is sold, and the inventory device moving from its previous setting, in a subtractive manner to indicate the length of material remaining on the bolt after the portion sold to the customer has been removed from the bolt.

In order to insure that the inventory device is coupled to the measuring device, mechanical means are provided which permits operation of the measuring device only when the inventory device is properly coupled thereto. The details of this coupling arrangement are shown in Fig. 6.

The cross sectional view shown in Fig. 6 shows three digital indicating wheels 21A, 21B, and 21C, shown here in elevation to indicate the method of numbering. Since the first order wheel indicates feet it has only three figures, zero, one, and two. The second and third order wheels show the number of yards and each wheel is numbered from zero to nine. The wheels are mounted on a common shaft 30 and the first order wheel 21C is secured to a bevel gear 31 which meshes with a similar gear 32 on shaft 33. At the lower end of shaft 33 a coupling means 34 is provided which is employed to couple to another shaft 42 which is part of the measuring device 24. Carry means are provided between the first and second order wheels and between the second and third so that one revolution of the first order wheel 21C moves the second order wheel 21B one-tenth of a revolution. A similar action occurs when the second order wheel completes a revolution and moves from a position which indicated nine to a new position which indicates zero. Any one of a number of carry systems may be employed, the one shown in Fig. 6 (detailed in Fig. 8) is the well-known Geneva movement and has been used in many computing devices and adding machines. A flat disk 35 is secured to the lower denominational order wheel. This disk carries a lug 36 near its periphery which engages a slot 37 in the Geneva gear 38 once during each revolution, causing it to move one-quarter of a turn. This motion also turns pinion 40 and gear 41, turning the next higher denominational wheel one-tenth of a revolution. A similar mechanism is provided between wheels 21B and 21A.

Shaft 42 in the measuring device is urged upwardly in its bearings by a flat spring 43 and in this position a bevel gear 44, secured to shaft 42, is disengaged from a second bevel gear 45 which is part of the measuring device and is turned when the dispensable material is being measured. When shaft 42 is in its raised position a shoulder 46 is raised and a spring lock 47 is moved into locking position with gear 45, thereby locking it against rotation and disabling the measuring device. When the inventory device is placed in recess 23, the coupling means 34 engages the end of shaft 42 pushing it down, engaging gear 44 with gear 45, and removing the lock 47 from the gear 45, thereby permitting the measuring device and the inventory device to turn together. It should be noted that the combination may be turned in either direction and if by accident too much material is drawn through slot 25 it may be returned in the opposite direction and the pointer 27 as well as the wheels 21 will move in the reverse direction.

The device shown in Fig. 6 is convenient to read because it always shows a single number in each of the windows 22. However, the carry device is not necessary and a simple gear train between each order may be employed. While such an indicator is more difficult to read, it can be operated faster and is generally easier to assemble. Such a device is shown in Fig. 7 where one counter wheel 50 is secured to a ten toothed gear 51. This gear engages a set of gears 52 and 53 secured to a common shaft and containing twenty-five and seven teeth, respectively. The seven tooth gear 53 engages a gear 54 having twenty-eight teeth which are secured to the next higher order wheel 55.

Figs. 9, 10, and 11, illustrate a form of inventory measuring device which is flat and indicates the number of feet remaining on the bolt through windows 56 formed in the side. The carry mechanism for such a counter is shown in Figs. 10 and 11, the carry action being performed by an extended tooth 57 secured to the bottom of the two lower order gears 58 and 60. Each of the gears has ten teeth and when a carry operation is not being performed, two gear locks 61 and 62 engage the teeth of the two higher order wheels 60 and 63, holding them in secure position so that vibration or rough handling cannot change their numerical setting. The lower order gear 58 is turned by a worm gear 64 which is secured to a shaft 65, similar to shaft 33 in Fig. 6. When a carry operation is made, a small lug 66 on either one of wheels 58 or 60 pushes one of the locks 61 or 62 out of the way of the teeth in the next higher order wheel and then the single tooth 57 engages and turns the next higher order wheel one-tenth of a revolution at which time lug 66 permits the lock 61 or 62 to engage the next tooth and lock the next higher order wheel in its new position.

Various other indicating and carrying means may be employed to measure the cloth or any other material as it is unwound from a bolt or removed from a container. Also, the invention is not limited to any particular form of indicating means which may be secured to or associated with each bolt of cloth. It is important, however, to provide a coupling means between the two measuring devices so that material cannot be dispensed with the measuring means unless these devices are properly coupled to each other. It will be apparent also that a plurality of inventory devices can be used in combination with a single measuring means.

While there have been described and illustrated specific embodiments of the invention, it will be obvious that various changes and modifications may be made therein without departing from the field of the invention which should be limited only by the scope of the appended claims.

I claim:

1. An inventory system for use in connection with dispensable material comprising; a first numerical indicator adapted to indicate a value responsive to a length of the dispensable material; a second numerical indicator, normally inoperative, including a material-engaging means and an indicating means which shows a value responsive to the length of material passed therethrough in engagement with said engaging means; and a separable coupling means between said indicators which renders said second indicator operable only when the two indicators are joined.

2. An inventory system for use in connection with dispensable material comprising; a first numerical indicator adapted to indicate a value responsive to a length of dispensable material; a second numerical indicator, normally inoperative, including a material-engaging means and an indicating means which shows a value responsive to the length of material passed therethrough in engagement with said engaging means; and a separable coupling means between said indicators which renders said second indicator operable only when the two indicators are joined, whereby a passage of material through the second indicator causes the first indicator to show numerical values in descending order and causes the second indicator to show numerical values in ascending order.

3. An inventory system for use in connection with dispensable material comprising; a first numerical indicator adapted to indicate a value responsive to a length of the dispensable material; a second numerical indicator, normally inoperative, including a material-engaging means and an indicating means which shows a value responsive to the length of material passed therethrough in engagement with said engaging means; a separable coupling means between said indicators which renders said second indicator operable only when the two indicators are joined, whereby a passage of material through the second indicator causes the first indicator to show numerical values in descending order and causes the second indicator to show numerical values in ascending order; and means for independently resetting each of said indicators when separated.

4. An inventory system for use in connection with dispensable material comprising; a plurality of first numerical indicators each adapted to be mounted on a bolt of dispensable material and each adapted to indicate a value responsive to a length of said material; a second numerical indicator, normally inoperative, including a material-engaging means and an indicating means which shows a value responsive to the length of material passed therethrough in engagement with said engaging means; means for joining any one of said plurality of first numerical indicators with said second indicator, said joining means adapted to render the second indicator operable, whereby a passage of material through the second indicator causes the first indicator to show numerical values in descending order and causes the second indicator to show numerical values in ascending order; and means for independently resetting each of said indicators when separated.

References Cited in the file of this patent

UNITED STATES PATENTS 1,177,825   Simpson et al. _____ Apr. 4, 1916
2,709,043   Just _____ May 24, 1955